United States Patent [19]
Lewis

[11] 3,899,936
[45] Aug. 19, 1975

[54] MECHANICAL LINKAGE

[75] Inventor: Geoffrey Arthur Lewis, Solihull, England

[73] Assignee: Lucas Aerospace Limited, Birmingham, England

[22] Filed: Apr. 8, 1974

[21] Appl. No.: 458,896

[30] Foreign Application Priority Data
May 3, 1973 United Kingdom............. 21025/73

[52] U.S. Cl................................. 74/479; 416/25
[51] Int. Cl.[2] ........................................ G05G 11/00
[58] Field of Search ............... 74/469, 479; 123/98; 416/25

[56] References Cited
UNITED STATES PATENTS
| | | | |
|---|---|---|---|
| 3,182,774 | 5/1965 | Basford............................ | 74/479 X |
| 3,496,795 | 2/1970 | Dinnendahl......................... | 74/469 |
| 3,641,833 | 2/1972 | Maroshick........................... | 74/479 |

Primary Examiner—Samuel Scott
Assistant Examiner—F. D. Shoemaker

[57] ABSTRACT

A mechanical linkage has an input lever pivoted on a carrier and coupled to a first link. Three additional links are pivotally interconnected with the first link to form a rhombus. A pivot point on the rhombus, which is opposite the pivotal mounting of the first lever, is constrained to move through an arc whose radius is equal to the lengths of each of the links forming the rhombus. The position of the centre of this arc is adjustable by a second lever. One of the links forming the rhombus is coupled to an output lever, whose position is thereby dependent on the positions of the input levers. There is a position of the first lever where the second lever is ineffective to move the output lever. The first lever can be locked in this position and the carrier moved pivotally on a support.

9 Claims, 6 Drawing Figures

PATENTED AUG 19 1975

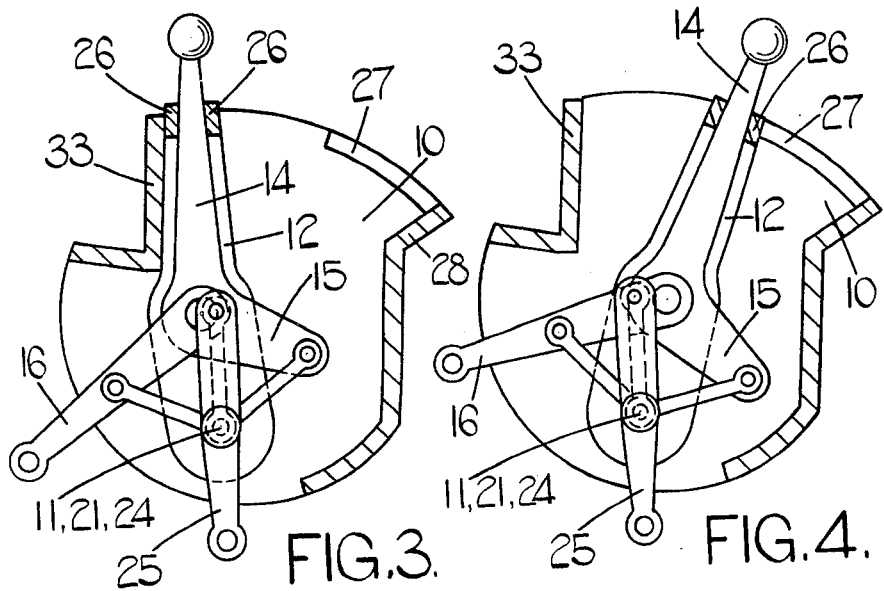
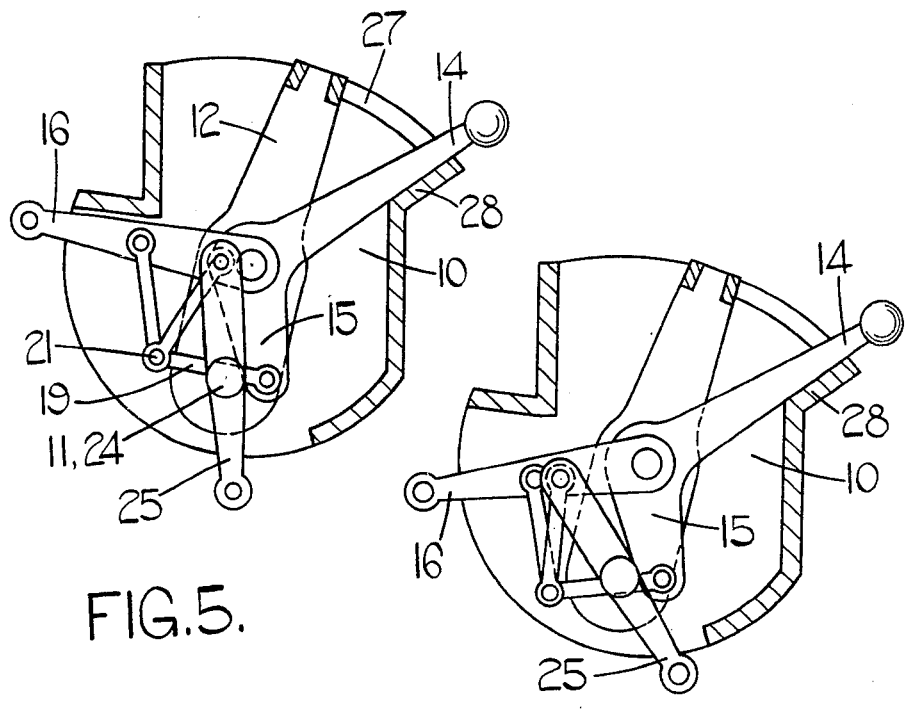

MECHANICAL LINKAGE

This invention relates to a mechanical linkage of the kind having two input members and an output member operable alternatively by the input members, the magnitude of travel of the output member relative to that of one of the input members being dependent on the position of the other input member.

A mechanical linkage according to the invention comprises a carrier, a first input member pivotally supported on said carrier, an output member supported on said carrier for movement about the pivotal axis of said first input member, six links of substantially equal effective lengths, arranged as follows:

a. one end of a first one of said links is secured to said first input member for movement about the pivotal axis thereof,
b. a second one of said links is mounted at one end thereof for pivotal movement about the axis of said first input member,
c. said second link is drivingly engaged with said output member,
d. one end of each of the third, fourth and fifth ones of said links are pivotally interconnected,
e. the other ends of the third and fourth links are respectively pivotally connected to the other ends of said first and second links,
f. one end of the sixth of said links is pivotally connected to the other end of the fifth link, a second input member supported on said carrier for pivotal movement about an axis parallel to the pivotal axis of the first input member, and spaced therefrom by the effective length of one of said links, the other end of said sixth link being secured to said second input member, a support structure upon which said carrier is mounted for pivotal movement about an axis which is aligned with the pivotal axis of said second input member, and means for interengaging said first input member and said carrier in a fixed relative position.

According to another aspect of the invention, a fuel control system includes a linkage as above defined and a fuel metering device having a control element responsive to the position of the output member, the first and second input members being respectively movable in response to first and second engine operating conditions.

An example of the invention will now be described with reference to the accompanying drawings, in which:-

The linkage will first be described with reference to FIG. 1, similar reference numerals being applied to corresponding parts on the other Figures.

Figure 1:
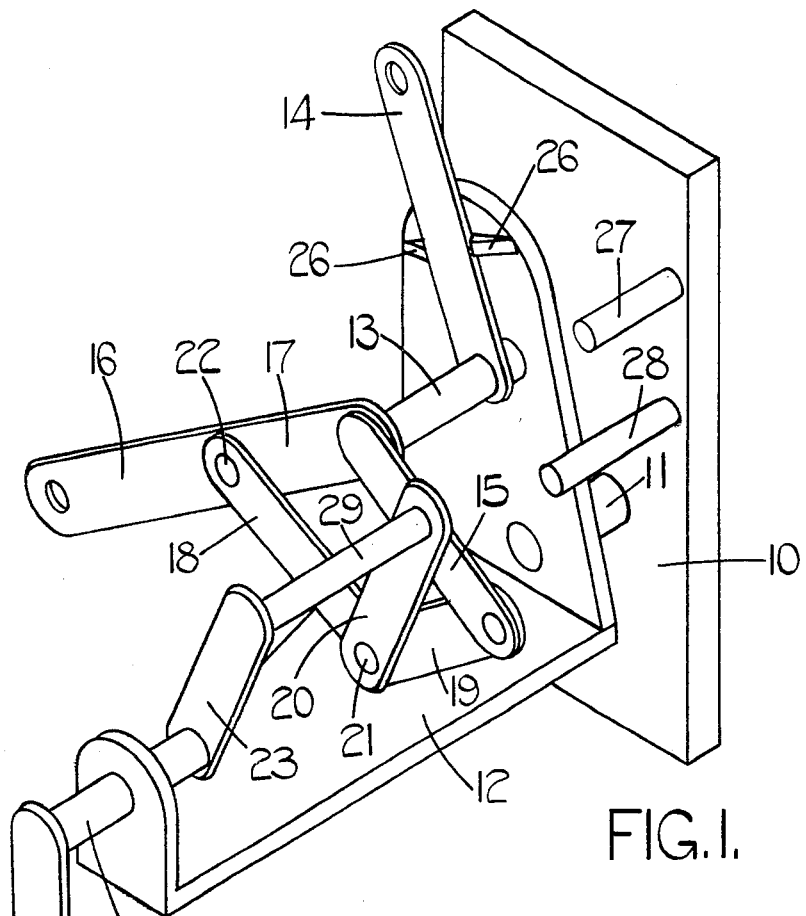
FIG. 1 shows, pictorially, a diagram of a linkage.

The linkage includes a relatively-fixed support structure 10 from which extends a stud 11 on which a carrier 12 is pivotally mounted. Pivotally mounted in carrier 12 is a spindle 13 whose axis is parallel to that of stud 11. Secured to spindle 13 is a lever 14 which forms a first input member. One end of a first link 15 is secured to the spindle 13 for rotation thereby.

A lever 16, forming an output member, is mounted for free rotation about the spindle 13. Intermediate the ends of the lever 16 is a pivot 22 which defines, between the pivot and the axis of spindle 13, a second link 17 whose effective length is equal to that of the first link 15.

Third, fourth and fifth links 18, 19, 20, having effective lengths equal to that of the first link 15, are mounted at one of their ends for free relative movement about a single pivot pin 21. The other end of link 18 is engaged with the pivot 22. The other end of link 19 is pivotally engaged with the end of link 15 remote from spindle 13. The other end of link 20 is pivotally connected to an end of a link 23 which is equal in length to link 15 and is secured to a shaft 24 journalled in the carrier 12. The axes of shaft 24 and spindle 13 are parallel and spaced apart by a distance equal to the effective lengths of links 15, 17, 18, 19, 20, 23. Secured to shaft 24 is a lever 25 which forms a second input member.

The axes of shaft 24 and stud 11 are aligned, whereby the axis of stud 11 is also spaced from that of spindle 13 by a distance equal to the effective lengths of the links.

The carrier 12 has a pair of projections 26 between which the lever 14 can be located, to maintain lever 14 and carrier 12 in a predetermined relative position. An abutment 27 on the support structure 10 limits pivotal movement of carrier 12 in one direction. After engagement of carrier 12 with abutment 27, lever 14 may be moved in the aforesaid one direction away from its location by projections 26, until engaged by a further abutment 28 on structure 10.

Figure 2:
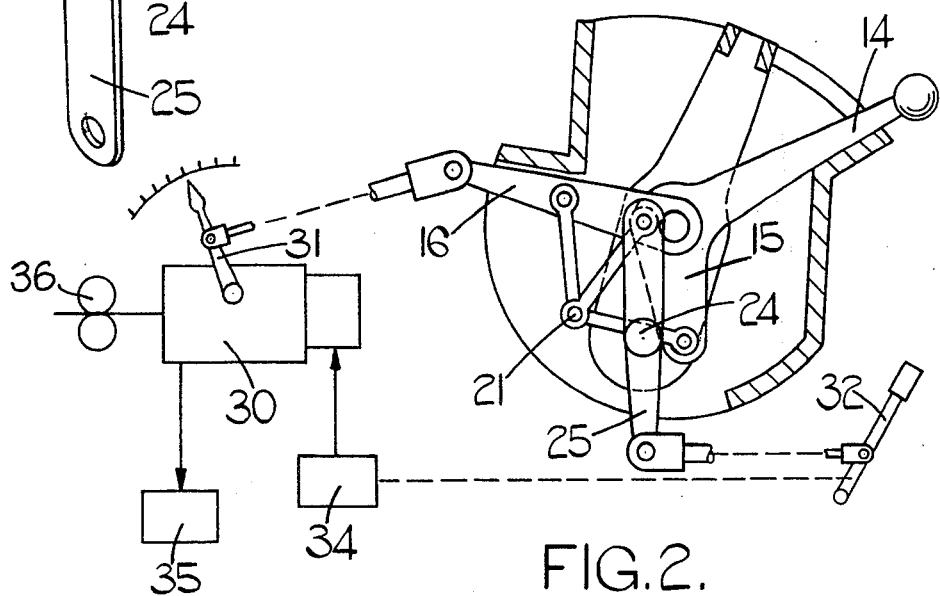
FIG. 2 shows a diagram of a fuel control system incorporating a linkage as shown in FIG. 1, and FIGS. 3, 4, 5 and 6 show several operating positions of the linkage.

In the arrangement shown in FIG. 2, a variable metering device 30, for controlling fuel flow from a pump 36 to an engine 35 of a helicopter, has a control arm 31 coupled to the output lever 16 of a linkage as described above. The first input lever 14 forms a power selector lever for the engine 35, and the second input lever 25 is coupled to a collective pitch selection lever 32 for the helicopter blades. The term collective pitch refers to the simultaneous increase in the pitch of all the blades to increase the lift of the helicopter. Such an increase in pitch will require an increased power output from the engine 35.

In normal operating conditions changes in fuel flow in response to changes in collective pitch are effected by means of an electronic control device 34. Control arm 31 operates a volume control whereby the response of device 30 to the control device 34 can be varied. Device 30 is so arranged that, in the absence of a control signal from device 34, fuel will still be delivered to the engine 35 unless control arm 31 is in a 'shut-off' position. In such normal operating conditions the first input lever 14 is, as shown in FIGS. 3 and 4, engaged between the projections 26 so that lever 14 and carrier 12 will pivot together about stud 11. The position of projections 26 is such that when arm 14 is located between them, pivot pin 21 is axially aligned with stud 11 and shaft 24. In this position movement of lever 25 has no effect on the position of output lever 16, and output lever 16 is moved by lever 14 only. The support structure 10 has a further abutment 33 engageable by the carrier 12 as shown in FIG. 3. With the carrier 12 moved by the input lever 14 into engagement with abutment 33, the output lever 16 has a position corresponding to zero fuel flow.

If carrier 12 is moved by input arm 14 into engagement with the abutment 27, as shown in FIG. 4, the output arm 16 is moved to a position corresponding to normal running of the engine. In this position of the linkage, movement of the collective pitch lever 32 still has no effect on the position of output lever 16, since the axes of the parts 11, 21 and 24 are still aligned. Variations of fuel flow to the engine are effected by means of the collective pitch lever 32 and the control device 34.

In the event of failure of the device 34 the input lever 14 is moved clockwise, as shown in the diagrams, out of its engagement between the projections 26, to a position which corresponds to the power expected to be required from the engine under maximum lift. Conveniently the positions of lever 14, when moved away from carrier 12, are calibrated in terms of the altitude at which the helicopter is to operate. FIG. 5 shows lever 14 moved into engagement with abutment 28, this position corresponding to a demand for maximum power, at a sea-level altitude of the helicopter. In this position the pivotal interconnection of links 15, 19 is adjacent the axes of parts 11, 24. Movement of input lever 25 by collective pitch lever 32 has a maximum effect on the position of output lever 16. As shown in FIG. 5, lever 25 is in its maximum clockwise position, whereby output lever 16 is moved to its maximum clockwise position.

FIG. 6 shows lever 25 moved away from its fully clockwise position, thereby reducing fuel flow to the engine.

It will be appreciated that movement of the output lever 16, in response to movement of input lever 25 by the collective pitch lever 32, is dependent on the position of lever 14.

I claim:

1. A mechanical linkage comprising a carrier, a first input member pivotally supported on said carrier, an output member supported on said carrier for movement about the pivotal axis of said first input member, six links of substantially equal effective lengths, arranged as follows:
   a. one end of a first one of said links is secured to said first input member for movement about the pivotal axis thereof,
   b. a second one of said links is mounted at one end thereof for pivotal movement about the axis of said first input member,
   c. said second link is drivingly engaged with said output member,
   d. one end of each of the third, fourth and fifth ones of said links are pivotally interconnected,
   e. the other ends of the third and fourth links are respectively pivotally connected to the other ends of said first and second links,
   f. one end of the sixth of said links is pivotally connected to the other end of the fifth link, a second input member supported on said carrier for pivotal movement about an axis parallel to the pivotal axis of the first input member, and spaced therefrom by the effective length of one of said links, the other end of said sixth link being secured to said second input member, a support structure upon which said carrier is mounted for pivotal movement about an axis which is aligned with the pivotal axis of said second input member, and means for interengaging said first input member and said carrier in a fixed relative position.

2. A linkage as claimed in claim 1 in which said output member comprises a lever of which the second one of said links forms part.

3. A linkage as claimed in claim 1 which includes a first stop for limiting pivotal movement of said carrier in one direction relative to said support structure.

4. A linkage as claimed in claim 3 which includes an abutment on said support structure engageable by said first input member when the latter is moved in said one direction out of its interengaged position.

5. A linkage as claimed in claim 1 in which said interengaging means is positioned so that in said fixed relative position, the pivotal interconnection of said third, fourth and fifth links is axially aligned with the pivotal axis of said second input member.

6. A linkage as claimed in claim 5 which includes a second stop for limiting movement of said carrier in a second direction relative to said support structure.

7. A fuel control system for an engine, including a linkage as claimed in claim 6 and a fuel metering device having a control member responsive to the position of the output member of the linkage, the first and second input members of the linkage being movable in response to requirements to vary the engine power output.

8. A fuel control system as claimed in claim 7 in which the positions of said output member, when the carrier and first input member are in said fixed relative position and when said carrier engages said first and second stops, respectively correspond to normal running and shut-off positions of the metering device control element.

9. A fuel control system as claimed in claim 8 in which the position of said output member, when said first input member is in engagement with said abutment on the support structure, corresponds to a maximum fuel flow position of said metering device control element.

* * * * *